(12) United States Patent
Usseglio et al.

(10) Patent No.: US 11,549,379 B2
(45) Date of Patent: *Jan. 10, 2023

(54) INTEGRAL SEALING MEMBERS FOR BLADES RETAINED WITHIN A ROTATABLE ANNULAR OUTER DRUM ROTOR IN A TURBOMACHINE

(71) Applicant: GE Avio S.r.l., Rivalta di Torino (IT)

(72) Inventors: Matteo Renato Usseglio, Turin (IT); Antonio Giuseppe D'Ettole, Rivoli (IT); Andrea Depalma, Rivalta di Torino (IT)

(73) Assignee: GE AVIO S.r.l., Rivalta di Torino (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,817

(22) Filed: Aug. 10, 2020

(65) Prior Publication Data

US 2021/0047933 A1 Feb. 18, 2021

(30) Foreign Application Priority Data

Aug. 13, 2019 (IT) .......................... 102019000014736

(51) Int. Cl.
| | |
|---|---|
| *F01D 5/20* | (2006.01) |
| *F01D 5/32* | (2006.01) |
| *F01D 5/22* | (2006.01) |
| *F01D 5/06* | (2006.01) |
| *F01D 5/02* | (2006.01) |

(52) U.S. Cl.
CPC ............. *F01D 5/20* (2013.01); *F01D 5/022* (2013.01); *F01D 5/06* (2013.01); *F01D 5/225* (2013.01); *F01D 5/323* (2013.01); *F05D 2220/32* (2013.01); *F05D 2260/30* (2013.01)

(58) Field of Classification Search
CPC . F01D 5/20; F01D 5/022; F01D 5/225; F01D 5/06; F01D 5/323; F05D 2220/32; F05D 2260/30
See application file for complete search history.

(56) References Cited

U.S. PATENT DOCUMENTS

| | | | |
|---|---|---|---|
| 3,339,833 A | | 9/1967 | Bill et al. |
| 3,703,081 A | * | 11/1972 | Krebs ..................... F01D 5/03 |
| | | | 60/226.1 |
| 4,451,205 A | | 5/1984 | Honda et al. |
| 4,623,298 A | | 11/1986 | Hallinger et al. |
| 4,730,983 A | | 3/1988 | Naudet et al. |
| 4,986,737 A | | 1/1991 | Erdmann |
| 5,131,813 A | | 7/1992 | Przytulski et al. |
| 5,197,281 A | | 3/1993 | Przytulski et al. |
| 5,257,909 A | | 11/1993 | Glynn et al. |

(Continued)

FOREIGN PATENT DOCUMENTS

GB 586561 A * 3/1947 ............... F01D 1/26

*Primary Examiner* — Igor Kershteyn
*Assistant Examiner* — Brian Christopher Delrue
(74) *Attorney, Agent, or Firm* — McGarry Bair PC

(57) ABSTRACT

A blade for a turbomachine includes a blade root portion for securing the blade to a rotatable annular outer drum rotor. The blade root portion includes one or more radial retention features for radially retaining each of the blade root portions within the rotatable annular outer drum rotor. Further, at least one of the radial retention feature(s) includes at least one sealing member integrated therewith.

20 Claims, 8 Drawing Sheets

(56) References Cited

U.S. PATENT DOCUMENTS

| | | | |
|---|---|---|---|
| 5,288,210 | A | 2/1994 | Albrecht et al. |
| 5,307,622 | A | 5/1994 | Ciokajlo et al. |
| 6,139,263 | A | 10/2000 | Klingels |
| 6,732,502 | B2 | 5/2004 | Seda et al. |
| 7,048,496 | B2 | 5/2006 | Proctor et al. |
| 7,186,073 | B2 | 3/2007 | Orlando et al. |
| 7,334,392 | B2 | 2/2008 | Moniz et al. |
| 7,451,592 | B2 | 11/2008 | Taylor et al. |
| 7,494,323 | B2 | 2/2009 | Douchkin et al. |
| 7,513,102 | B2 | 4/2009 | Moniz et al. |
| 8,015,798 | B2 | 9/2011 | Norris et al. |
| 8,454,303 | B2 | 6/2013 | Garcia-Crespo |
| 8,777,563 | B2 | 7/2014 | Sarawate et al. |
| 8,784,064 | B2 | 7/2014 | Aschenbruck et al. |
| 8,869,504 | B1 | 10/2014 | Schwarz et al. |
| 8,935,913 | B2 | 1/2015 | Kupratis et al. |
| 9,045,990 | B2 * | 6/2015 | Alvanos ................ F01D 5/282 |
| 9,133,855 | B2 * | 9/2015 | Borufka ................ F04D 29/321 |
| 9,194,244 | B2 | 11/2015 | Willett, Jr. |
| 9,404,387 | B2 | 8/2016 | Mitaritonna et al. |
| 9,506,367 | B2 | 11/2016 | Clouse |
| 9,739,205 | B2 | 8/2017 | Schwarz et al. |
| 9,777,576 | B2 * | 10/2017 | Maguire .................. F01D 5/06 |
| 9,822,659 | B2 | 11/2017 | Arikawa et al. |
| 9,840,928 | B2 | 12/2017 | Brummitt-Brown et al. |
| 2002/0158417 | A1 * | 10/2002 | Wallace .................. C23C 8/24 |
| | | | 277/414 |
| 2003/0163983 | A1 * | 9/2003 | Seda ...................... F01D 5/03 |
| | | | 60/226.1 |
| 2004/0018081 | A1 * | 1/2004 | Anderson, Jr. ........ F01D 25/14 |
| | | | 415/108 |
| 2009/0041610 | A1 | 2/2009 | Meier |
| 2010/0129227 | A1 * | 5/2010 | Schilling ................ F01D 5/03 |
| | | | 416/229 A |
| 2015/0192028 | A1 * | 7/2015 | Gieg ...................... F01D 11/08 |
| | | | 415/173.1 |
| 2017/0211590 | A1 | 7/2017 | Moniz et al. |
| 2018/0142564 | A1 * | 5/2018 | Taglieri ................ F01D 25/246 |
| 2018/0223732 | A1 * | 8/2018 | Clements ................ F02C 3/067 |
| 2019/0093489 | A1 | 3/2019 | Mondal et al. |

\* cited by examiner

INTEGRAL SEALING MEMBERS FOR BLADES RETAINED WITHIN A ROTATABLE ANNULAR OUTER DRUM ROTOR IN A TURBOMACHINE

GOVERNMENT SPONSORED RESEARCH

The project leading to this application has received funding from the Clean Sky 2 Joint Undertaking under the European Union's Horizon 2020 research and innovation program under grant agreement No. CS2-FRC-GAM 2018/2019-807090.

FIELD

The present disclosure relates generally to turbomachines, and more particularly, to integral sealing members for blades retained within a rotatable annular outer drum rotor of a turbomachine.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Gas turbine engines generally include a plurality of rotating rotor blades in at least one of a compressor of the compressor section or a turbine of the turbine section. Moreover, at least certain gas turbine engines also include a plurality of counter-rotating rotor blades in at least one of the compressor of the compressor section or the turbine of the turbine section. Common rotating blades are assembled and retained internally by a disk, e.g. by means of the blade root, dovetail or fir tree shaped or with a third part as a rivet or a bolted joint. The disk is typically located internally respect to the blade row. Blades retained within the rotatable annular outer drum rotor are similarly attached to a rotating part, but externally. As such, the outer drum rotor generally includes a drum, the blades, and separate rotating shrouds.

For example, as shown in FIG. 1, a cross-sectional view of a counter-rotating blade 1 according to conventional construction is illustrated. As shown, the blade 1 includes a blade root portion 2 for securing to a drum rotor 3. In addition, as shown, a separate rotating shroud 4 may be attached to the drum rotor 3 for further securing the blade root portion within the drum rotor 3. In certain instances, a separate sealing member 5 may be attached to the rotating shroud 4 to prevent undesirable air flow purge from entering the external cavities of the gas turbine engine, thereby limiting the loss of engine performance. In addition, the sealing member 5 may act as a thermal barrier, thereby providing thermal protection to the drum rotor 3.

Notwithstanding the aforementioned, there is a continuing need for improved features associated with the blades retained within the drum rotor so as to improve operation efficiency of the gas turbine engine. Accordingly, the present disclosure is directed to an integrated sealing member for blades retained within a routable annular outer drum rotor of a turbomachine.

BRIEF DESCRIPTION

Aspects and advantages of the invention will be set forth in part in the following description, or may be obvious from the description, or may be learned through practice of the invention.

In one aspect, the present disclosure is directed to a turbomachine. The turbomachine includes a rotatable annular outer drum rotor connected to a first plurality of blades. Each of the first plurality of blades includes a blade root portion secured to the rotatable annular outer drum rotor. Each of the blade root portions includes one or more radial retention features for radially retaining each of the blade root portions within the rotatable annular outer drum rotor. Further, at least one of the one or more radial retention features comprising at least one sealing member integrated therewith.

In another aspect, the present disclosure is directed to a blade for a turbomachine. The blade includes a blade root portion for securing the blade to a rotatable annular outer drum rotor. The blade root portion includes one or more radial retention features for radially retaining each of the blade root portions within the rotatable annular outer drum rotor. Further, at least one of the one or more radial retention features includes at least one sealing member integrated therewith. It should be appreciated that the blade may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
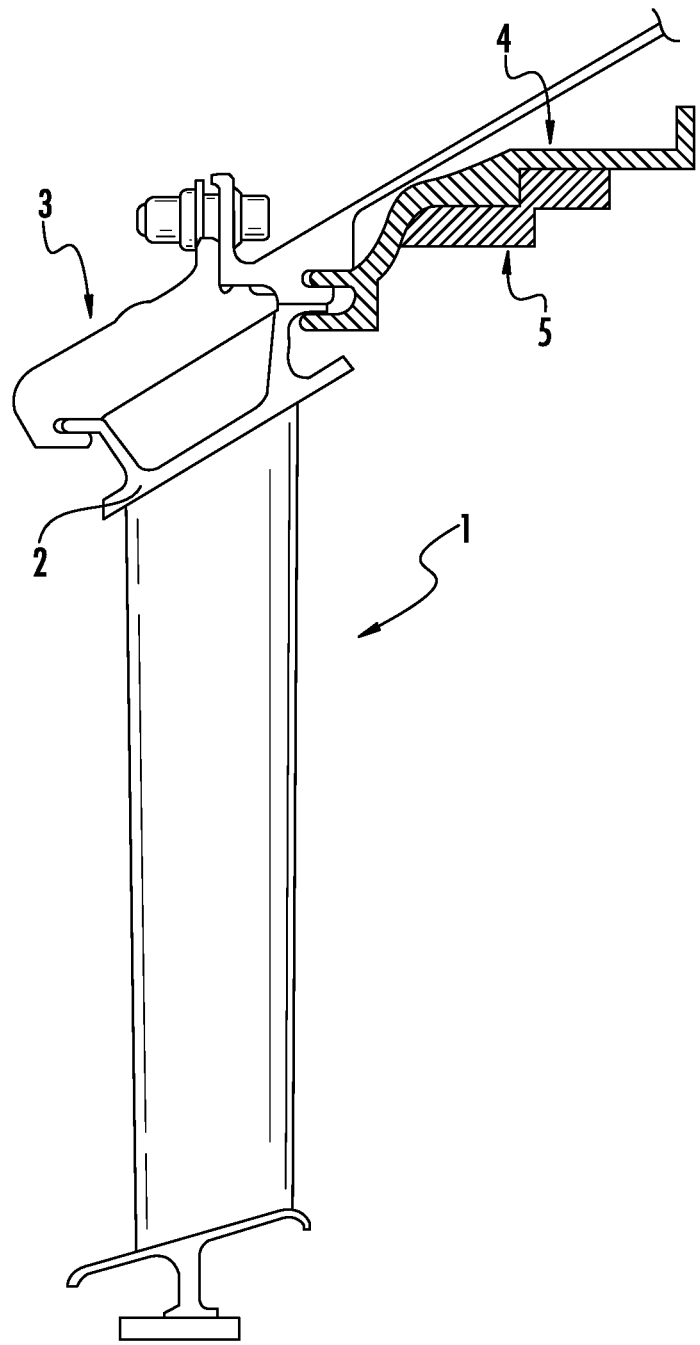
FIG. 1 illustrates a cross-sectional view of a turbine blade according to conventional construction.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to direct coupling, fixing, or attaching, as well as indirect coupling, fixing, or attaching through one or more intermediate components or features, unless otherwise specified herein. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
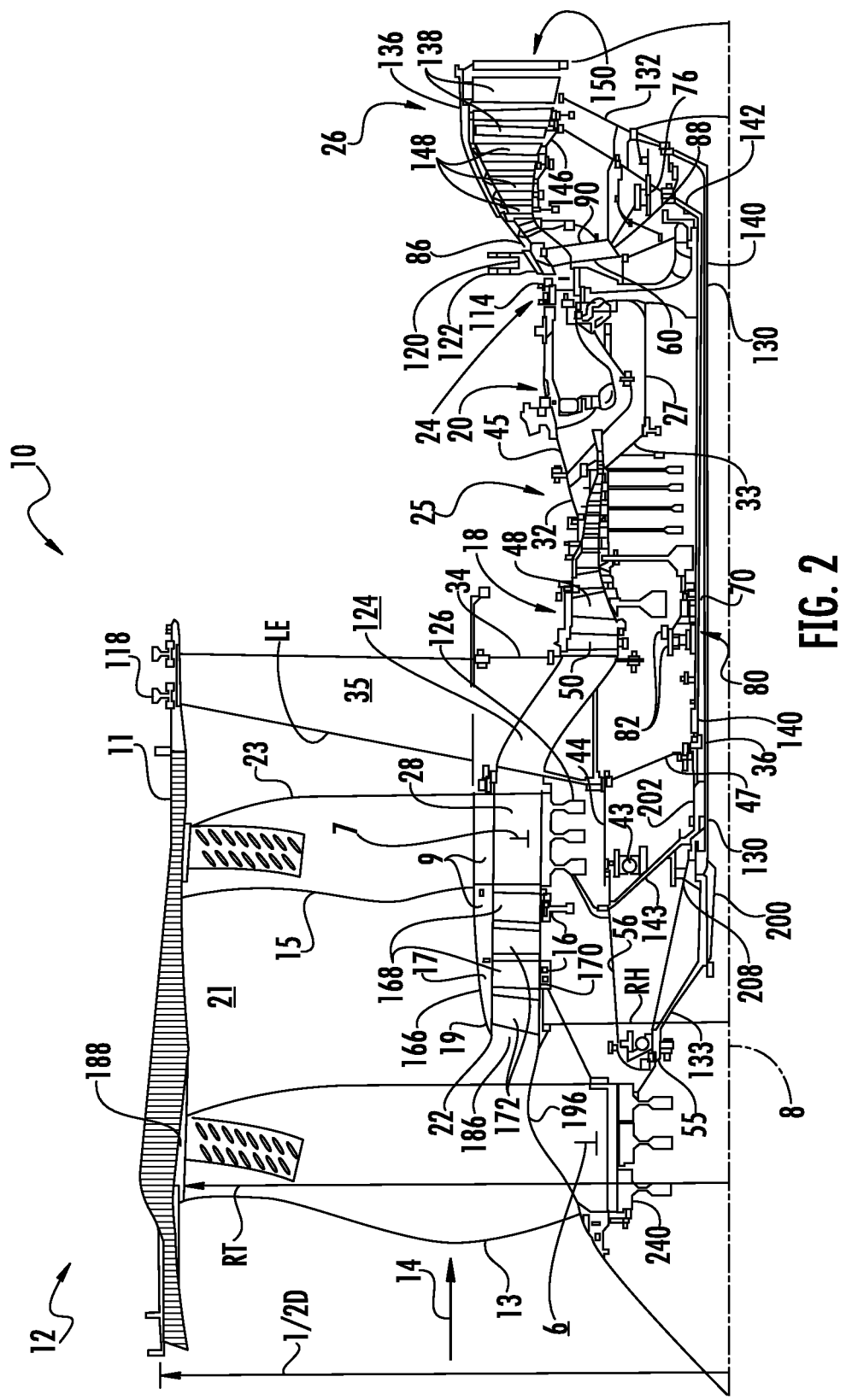
FIG. 2 illustrates a longitudinal sectional view of one embodiment of an aircraft turbofan gas turbine engine with a counter rotating low pressure turbine supported by an inter-turbine frame axially located between the low pressure turbine and a high pressure turbine.

Referring now to the drawings, FIG. 2 illustrates a schematic view of one embodiment of turbomachine, such as a turbofan gas turbine engine 10 according to the present disclosure. As shown, the gas turbine engine 10 is circumscribed about an engine centerline 8 and includes a fan section 12 which receives inlet airflow of ambient air 14. The fan section 12 has counter rotating first and second fans 6 and 7 including first and second fan blade rows 13 and 15 and counter rotating first and second boosters 16 and 17, respectively. The counter rotating first and second boosters 16 and 17 are axially located between the counter rotating first and second fan blade rows 13 and 15, an arrangement which provides reduced noise emanating from the fan section 12. Following the fan section 12 is a high pressure compressor (HPC) 18, a combustor 20 which mixes fuel with the air 14 pressurized by the HPC 18 for generating combustion gases which flow downstream through a high pressure turbine (HPT) 24, and a counter rotating low pressure turbine (LPT) 26 from which the combustion gases are discharged from the engine 10. The engine 10 is designed such that the last stage of the second booster 17 and, in the exemplary embodiment, the second fan blade row 15 are counter rotatable with respect to the high pressure compressor 18. This reduces the sensitivity of the engine 10 to airflow inlet distortion of the fan section 12. It also reduces mutual sensitivity to rotating stall cells in the other rotors.

A high pressure shaft 27 joins the HPT 24 to the HPC 18 to substantially form a first or high pressure rotor 33. The high pressure compressor 18, the combustor 20, and the high pressure turbine 24 collectively are referred to as a core engine 25 which includes, for the purposes of this patent, the high pressure shaft 27. The core engine 25 is modular such that as a single unit it can be independently replaced separate from the other parts of the gas turbine.

A bypass duct 21 radially, bounded by a fan casing 11 and a rotatable annular radially inner bypass duct wall 9, surrounds the counter rotating first and second boosters 16 and 17 and an inlet duct 19 to the high pressure compressor 18 of the core engine 25. The bypass duct 21 is radially bounded by a fan casing 11 and an annular radially inner bypass duct wall 9. The radially inner bypass duct wall 9 includes a rotatable wall section 22 fixedly mounted to the second fan blade row 15 and from which the second booster 17 depends radially inwardly. A radially outer portion 23 of the second fan blade row is radially disposed within the bypass duct 21.

Figure 3:
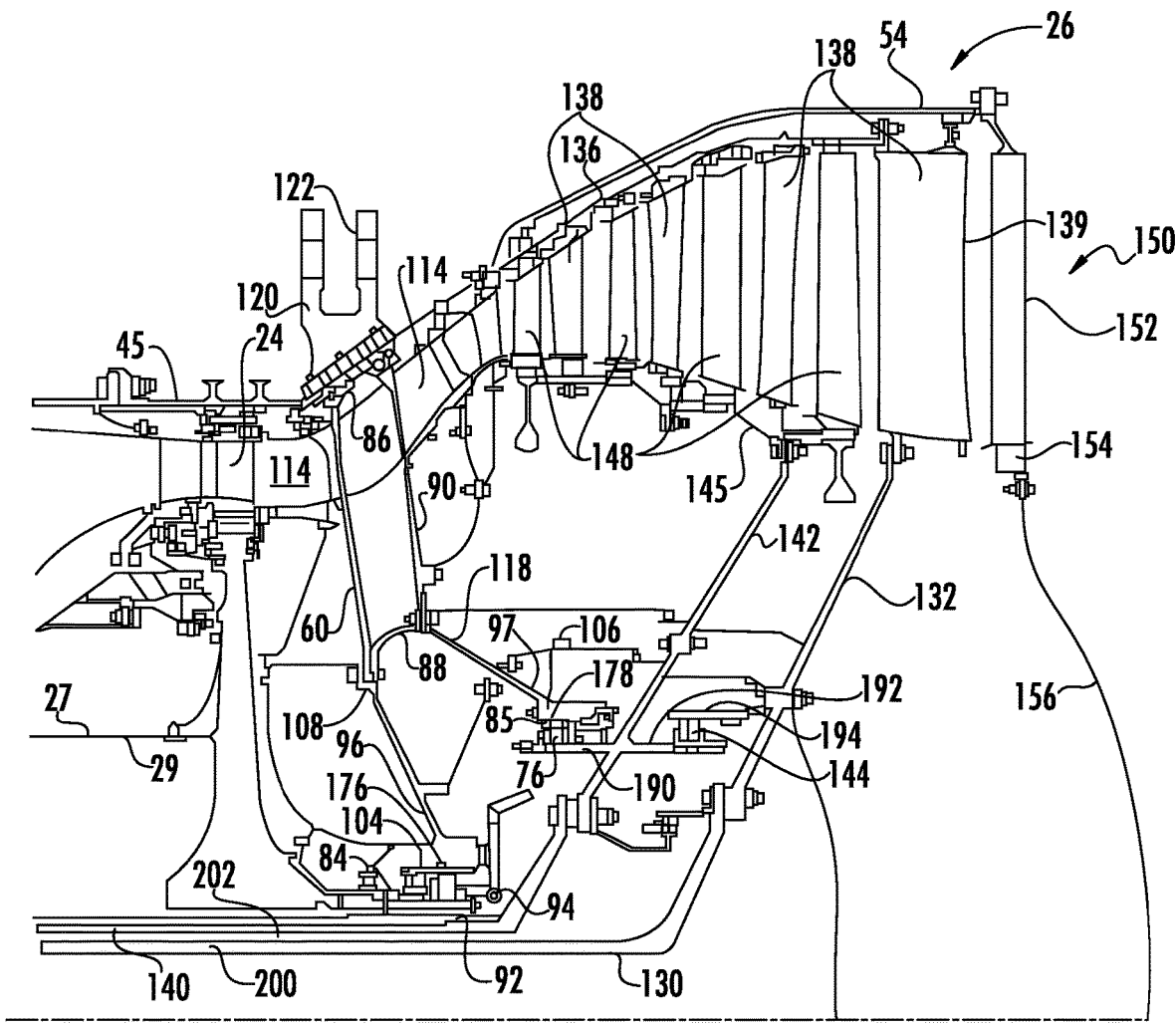
FIG. 3 illustrates an enlarged view illustration of the inter-turbine frame and counter rotating low pressure turbine rotors of the engine in FIG. 1.

Referring to FIGS. 2 and 3, the counter rotating low pressure turbine 26 includes an annular outer drum rotor 136 rotatably mounted to a low pressure inner shaft 130 by an aft low pressure inner conical shaft extension 132. The outer drum rotor 136 includes a plurality of low pressure turbine blade rows 138 extending radially inwardly therefrom and axially spaced from each other. The drum rotor 136 is cantilevered off of a final stage 139 of the low pressure turbine blade rows 138 which is bolted to the aft low pressure inner conical shaft extension 132. The counter rotating low pressure turbine 26 also includes an annular low pressure inner drum rotor 146 rotatably mounted to a low pressure outer shaft 140 by an aft low pressure outer conical shaft extension 142. The inner drum rotor 146 includes a plurality of second low pressure turbine blade rows 148 extending radially outwardly therefrom and axially spaced from each other. The first low pressure turbine blade rows 138 are interdigitated with the second low pressure turbine blade rows 148.

The low pressure outer shaft 140 drivingly connects the inner drum rotor 146 to the second fan blade row 15 and the second booster 17. The second fan blade row 15 is connected to the low pressure outer shaft 140 by a forward conical outer shaft extension 143. The low pressure outer shaft 140, the inner drum rotor 146, the second fan blade row 15, and the second booster 17 are major components of a low pressure outer rotor 202. The low pressure inner shaft 130 drivingly connects the outer drum rotor 136 to the first fan blade row 13 and the first booster 16. The first fan blade row 13 is connected to the low pressure inner shaft 130 by a forward conical inner shaft extension 133. The low pressure inner shaft 130, the outer drum rotor 136, the first fan blade row 13, and the first booster 16 are major components of a low pressure inner rotor 200.

The first booster 16 includes an annular first booster rotor section 166 including the rotatable wall section 22 from which axially spaced apart first booster blade rows 168 extend radially inwardly. The annular first booster rotor section 166 is illustrated as being integrally bladed in a manner similar to an integrally bladed disk, commonly referred to as a Blisk, or an integrally bladed rotor which has been used in conventional rotors because they are lightweight and allow no blade attachment leakage. The operating low speeds of the boosters and the low weight integrally bladed disk design of the first booster rotor section 166 helps minimize stresses and deflections of the first booster rotor section 166.

The second booster 17 includes an annular second booster rotor section 170 from which axially spaced apart second booster blade rows 172 extend radially outwardly. A radially inner portion 28 of the second fan blade row 15 is radially disposed within the inlet duct 19 and rotates with the second booster 17 and therefore is considered part of the second booster 17 and a second booster blade row 172. The first and second booster blade rows 168 and 172 are interdigitated and are counter rotating. The first and second fan blade rows 13 and 15 are fixedly attached to the first and second booster rotor sections 166 and 170, respectively. The low pressure inner and outer shafts 130 and 140, respectively, are at least, in part, rotatably disposed co-axially with and radially inwardly of the high pressure rotor 33.

The gas turbine engine 10 also has frame structure 32 including a forward or fan frame 34 connected by an engine casing 45 to a mid-engine or inter-turbine frame 60. The second fan blade row is axially located close to struts 35 of the fan frame 34 and so the leading edges of struts 35 are swept or leaned axially aftwardly to reduce noise. The engine 10 is mounted within or to an aircraft such as by a pylon (not illustrated) which extends downwardly from an aircraft wing. The inter-turbine frame 60 includes a first structural ring 86, which may be a casing, disposed co-axially about the centerline 8. The inter-turbine frame 60 further includes a second structural ring 88 disposed co-axially with and radially spaced inwardly of the first structural ring 86 about the centerline 8. The second structural ring 88 may also be referred to as a hub. A plurality of circumferentially spaced apart struts 90 extend radially between the first and second rings 86 and 88 and are fixedly joined thereto. The struts 90 are hollow in the exemplary embodiment of the invention illustrated herein but, in other embodiments, the struts may not be hollow. Because the inter-turbine frame 60 is axially located between the HPT 24 and the LPT 26 of the high pressure rotor 33 and the low pressure inner and outer rotors 200 and 202, it is referred to as an inter-turbine frame also sometimes referred to as a mid-engine frame. An inter-turbine transition duct 114 between the HPT 24 and the LPT 26 passes through the inter-turbine frame 60.

The engine is mounted to the aircraft at a forwardly located fan frame forward mount 118 on the fan frame 34 and at an aftwardly located turbine frame aft mount 120 on the inter-turbine frame 60. The engine 10 may be mounted below an aircraft wing by a pylon at the forward mount 118 and the aft mount 120 spaced axially downstream from the forward mount 118. The aft mount 120 is used to fixedly join the inter-turbine frame 60 to a platform which is fixedly joined to the pylon. In one embodiment, the aft mount 120 includes a U-shaped clevis 122. Conventional mounts often use a set of circumferentially spaced apart U-shaped clevises 122 (only one of the U-shaped clevises is shown in the cross-sectional illustrations in the figures) on the inter-turbine frame 60. The U-shaped clevises 122 are designed to be connected by a set of pins to a set of links. The links are connected to a platform on the bottom of the pylon. The U-shaped clevises 122 are one type of frame connecting means for connecting the engine to an aircraft. Other types of mounting means besides clevises are known in the aircraft industry and can be utilized to mount the frame of the present invention and the engine to the aircraft.

Figure 4:
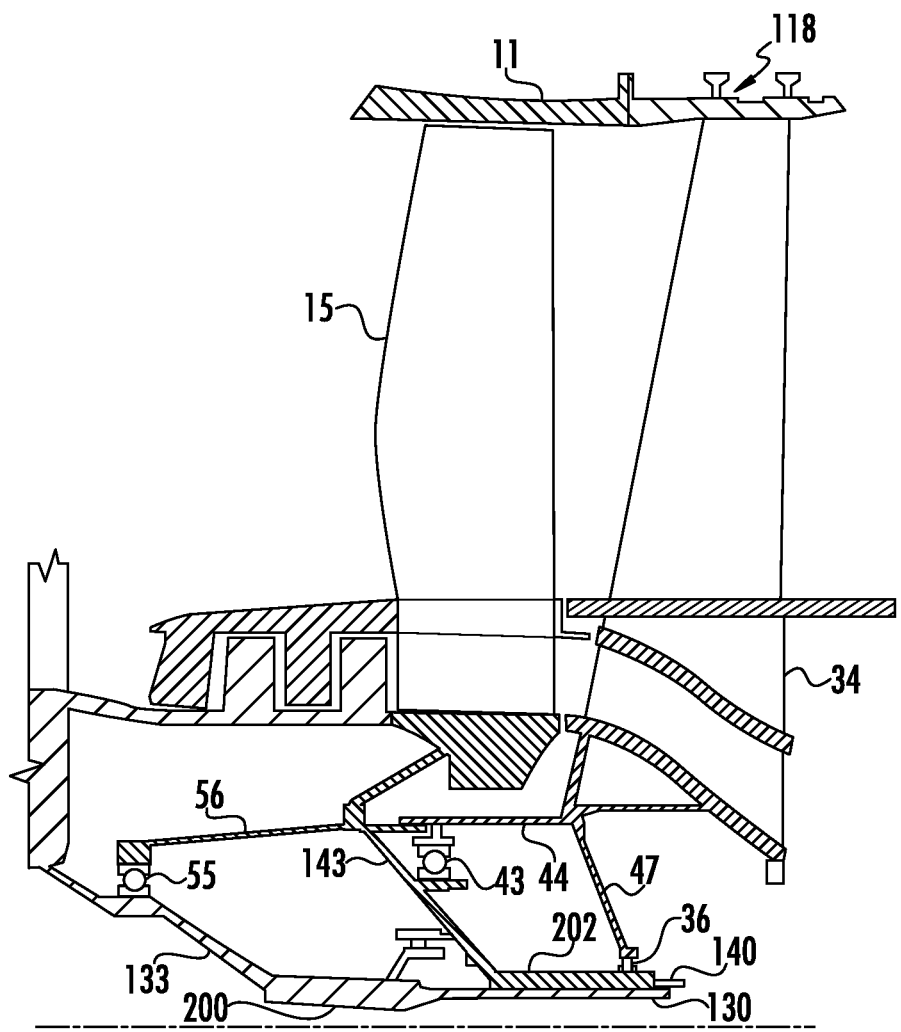
FIG. 4 illustrates an enlarged view illustration of a fan frame and forward bearings and sump of the engine in FIG. 1.

Referring more particularly to FIG. 4, the low pressure outer rotor 202, by way of the forward conical outer shaft extension 143, is rotatably supported axially and radially from the fan frame 34 by an aft thrust bearing 43 mounted in a first bearing support structure 44 and a second bearing 36, a roller bearing, mounted in a second bearing support structure 47. The low pressure inner rotor 200, by way of the forward conical inner shaft extension 133, is rotatably supported axially and radially from the fan frame 34 by a forward differential thrust bearing 55 which is mounted between a forwardly extending extension 56 of the forward conical outer shaft extension 143 and the forward conical inner shaft extension 133. The low pressure inner rotor 200 is further rotatably supported radially from the fan frame 34 by a forward differential bearing 208, a roller bearing, between the low pressure inner shaft 130 and the low pressure outer shaft 140. The first and second bearing support structures 44 and 47 are fixedly attached to the fan frame 34.

Referring more particularly to FIG. 3, the low pressure outer rotor 202, by way of the aft low pressure outer conical shaft extension 142 connected to the low pressure outer shaft 140, is rotatably supported radially by a third bearing 76 within the inter-turbine frame 60. The third bearing 76 is disposed between an aft bearing support structure 97 attached to an aft portion 110 of the inter-turbine frame 60 and a forward inner extension 190 of the aft low pressure outer conical shaft extension 142. The low pressure outer rotor 202 is most aftwardly rotatably supported by the third bearing 76 which is thus referred to as an aftwardmost low pressure rotor support bearing. The inter-turbine frame 60 of the present invention is axially located between the HPT 24 and the LPT 26 and thus substantially supports the entire low pressure turbine 26.

The low pressure inner rotor 200, by way of the aft low pressure inner conical shaft extension 132 connected to the low pressure inner shaft 130, is rotatably supported radially by the aft low pressure outer conical shaft extension 142 of the low pressure outer rotor 202. A differential bearing 144 (also referred to as an inter-shaft bearing) is disposed between an aft inner extension 192 of the aft low pressure outer conical shaft extension 142 and an outer extension 194 of the aft low pressure inner conical shaft extension 132. This allows the low pressure inner and outer rotors 200 and 202 to counter rotate.

Referring back to FIG. 2, a forward high pressure end 70 of the high pressure compressor 18 of the high pressure rotor 33 is radially rotatably supported by a bearing assembly 80 mounted in a bearing assembly support structure 82 attached to the fan frame 34. Referring more particularly to FIG. 2, an aft end 92 of the high pressure rotor 33 is aftwardly radially rotatably supported by a fifth bearing 94 mounted in a forward bearing support structure 96 attached to a forward portion 108 of the inter-turbine frame 60. The forward and aft bearing support structures 96 and 97 which are fixedly joined or attached to the forward and aft portions 108 and 110, respectively, of the inter-turbine frame 60 and thus are spaced axially apart. The forward and aft portions 108 and 110, respectively, of the inter-turbine frame 60 are separated by the second structural ring 88.

Forward and aft sump members 104 and 106 are joined to the inter-turbine frame 60 and carried by forward and aft bearing support structures 96 and 97. The forward and aft sump members 104 and 106 support the fifth bearing 94 and the third bearing 76 in forward and aft cylindrical central bores 84 and 85, respectively, of the sump members. The fifth bearing 94 and the third bearing 76 have forward and aft fixed outer races 176 and 178 that are fixedly connected to the forward and aft bearing support structures 96 and 97, respectively.

Located aft of the LPT 26 is an outlet guide vane assembly 150 which supports a stationary row of outlet guide vanes 152 that extend radially inwardly between a low pressure turbine casing 54 and an annular box structure 154. The outlet guide vane assembly 150 deswirls gas flow exiting the LPT 26. The low pressure turbine casing 54 connected is bolted to the engine casing 45 at the end of the inter-turbine transition duct 114 between the HPT 24 and the LPT 26. A dome-shaped cover plate 156 is bolted to the annular box structure 154. The outlet guide vane assembly 150 is not referred to and does not function as a frame because it does not rotatably support any of the engine's rotors.

The high pressure compressor 18 of turbofan gas turbine engine 10 of the present invention is operable and designed to operate with a relatively high compressor pressure ratio in a range of about 15 to about 30 and an overall pressure ratio in a range of about 40 to about 65. The compressor pressure ratio is a measure in the rise of pressure across just the high pressure compressor 18. The overall pressure ratio is a measure in the rise of pressure across the fan all the way through the high pressure compressor 18, i.e., it is a ratio of pressure exiting the high pressure compressor divided by pressure of ambient air 14 entering the fan section 12. The high pressure compressor 18 is illustrated having six high pressure stages 48 and three variable vane stages 50 for the first four of the high pressure stages 48. Less than four variable vane stages 50 may be used. The high pressure compressor 18 has a relatively small number of the high pressure stages 48 and the invention contemplates using between 6 and 8 of the high pressure stages and about four of the variable vane stages 50 or less. This makes for a short engine while still having a high overall pressure ratio in a range of 40-65.

The engine has a design bypass ratio in a range of 5-15 and a design fan pressure ratio in a range of 1.4-2.5. The counter rotating first and second fan blade rows 13 and 15 are designed to operate with tip speeds that, for the two blade rows, sum to a range of about 1000 to 2500 feet/sec which allows the use of light weight composite fan blades. Light weight, uncooled, high temperature capability, counter rotating ceramic matrix composite (CMC) airfoils may be used in the counter rotating low pressure turbine 26. Thus, the engine 10 and the fan section 12 may be described as having a sum of operational fan tip speeds of the first and second fan blade rows 13 and 15 in a range of 1000 to 2500 feet per second.

Referring still to FIG. 2, a tip radius RT is illustrated, as measured from the engine centerline 8 to a fan blade tip 188 of the first fan blade row 13 and a hub radius RH as measured from the engine centerline 8 to a rotor hub 196 of the low pressure inner rotor 200 at an entrance 186 to the inlet duct 19 to the high pressure compressor 18 of the core engine 25. The engine 10 of the present invention may be designed with a small fan inlet hub to tip radius ratio (RH/RT) in a range between 0.20 and 0.35. For a given set of fan inlet and inlet duct annulus areas a low fan inlet hub to tip radius ratio allows a smaller fan diameter when compared to a larger ratio.

However, fan inlet hub to tip radius ratio levels are constrained by the ability to design a disk to support the rotating fan blades. The fan blades in the exemplary embodiment illustrated herein are made of lightweight composite materials or aluminum and rotor fan tip speeds are designed so that a fan disk 126 can be designed for the fan inlet hub to tip radius ratio to be as low as 0.20. The low fan inlet hub to tip radius ratio allows low slopes and short lengths of the core engine transition duct 124 between the fan section 12 and the high pressure compressor 18 and of the inter-turbine transition duct 114 between the HPT 24 and the LPT 26.

Figure 5:
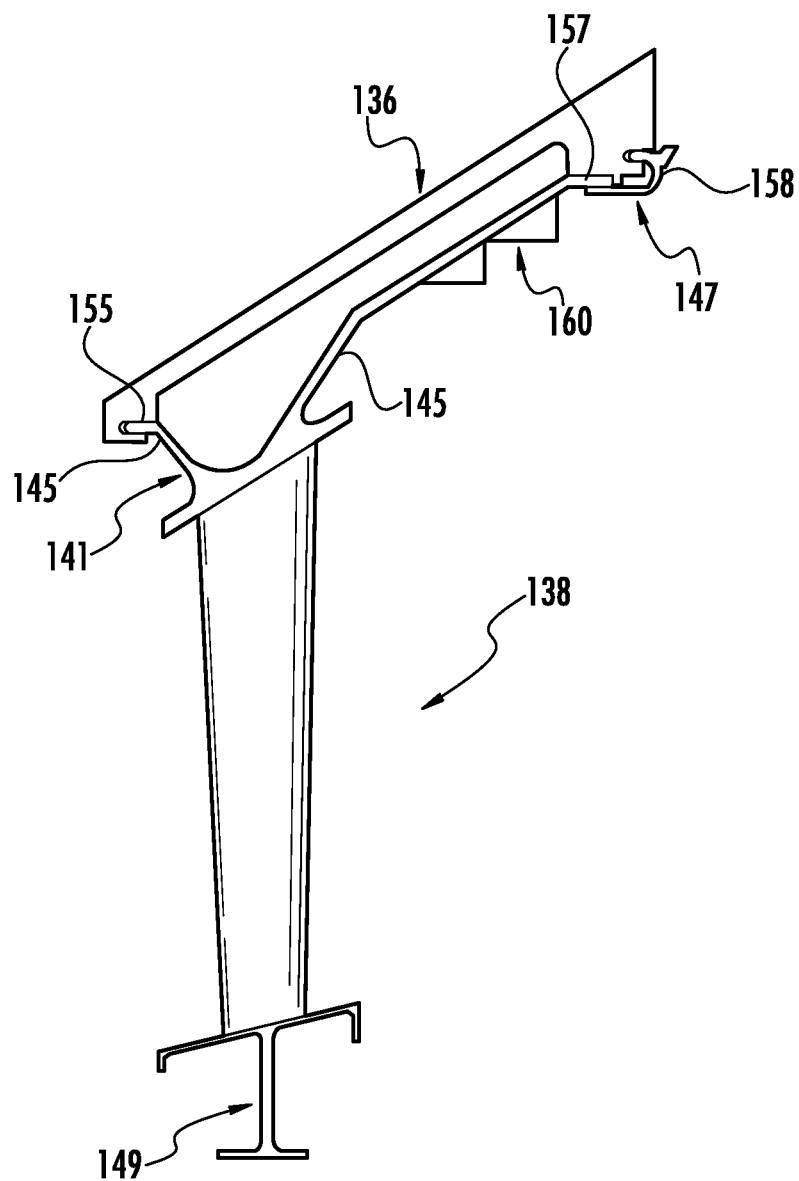
FIG. 5 illustrates a cross-sectional view of one embodiment of one of the first plurality of low pressure turbine blades according to the present disclosure.
Figure 8:
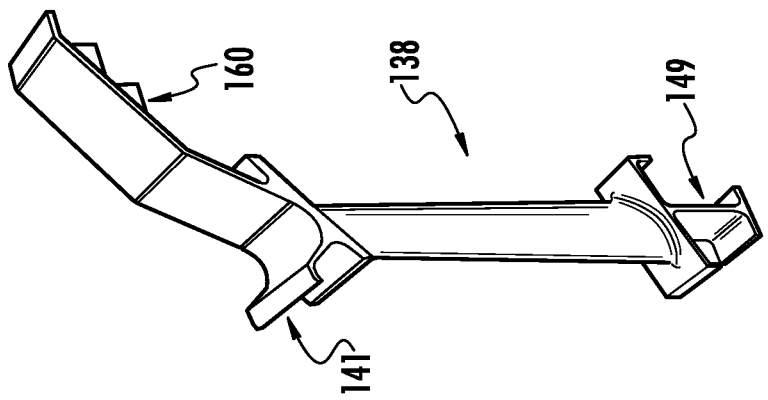
FIG. 8 illustrates yet another perspective view of the low pressure turbine blade illustrated in FIG. 6.
Figure 7:
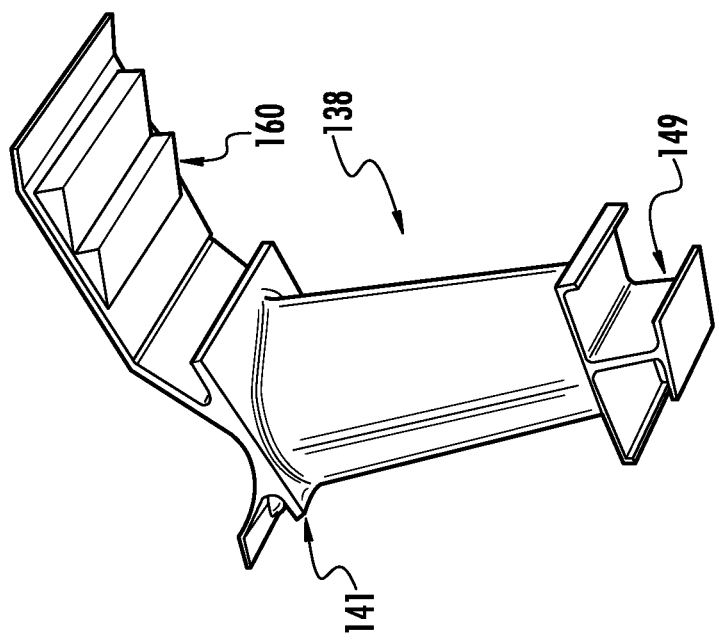
FIG. 7 illustrates another perspective view of the low pressure turbine blade illustrated in FIG. 6.
Figure 6:
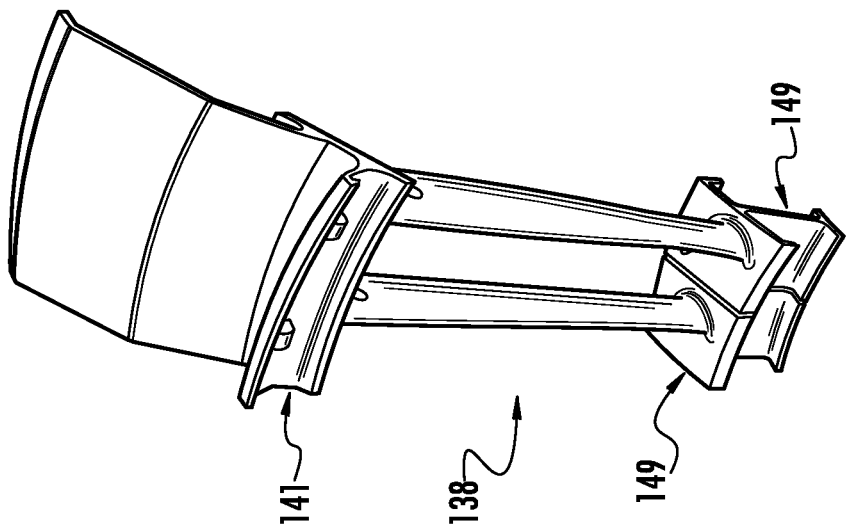
FIG. 6 illustrates a perspective view of one embodiment of one of the first plurality of low pressure turbine blades according to the present disclosure.

Referring now to FIGS. 5-8 and 9A-9F, various views of multiple embodiments of one of the first plurality of low pressure turbine blades 138 according to the present disclosure are illustrated. Referring particularly to FIG. 5, the low pressure turbine blade 138 includes a blade root portion 141 for securing to the annular outer drum rotor 136. In addition, each of the first plurality of low pressure turbine blades 138 may include a blade tip portion 149 opposite the blade root portion 141. Further, as shown, each of the blade root portions 141 may include one or more structural radial retention features 145 for radially retaining each of the blade root portions 141 within the annular outer drum rotor 136 and one or more axial retention features 147 for axially retaining each of the blade root portions 141 within the annular outer drum rotor 136.

More specifically, as shown, the structural radial retention feature(s) 145 may include a plurality of the radial retention hooks 155, 157 or flanges (e.g. mirrored hooks on opposing sides of the blade root portion 141). For example, as shown generally in FIGS. 5-8 and 9A-9F, the radial retention feature(s) 145 may include opposing radial retention hooks 155, 157. More specifically, as shown, the opposing radial retention hooks 155, 157 may include, at least, a first radial retention hook 155 and a second radial retention hook 157. In further embodiments, as shown particularly in FIG. 9B, the radial retention hooks may further include a third radial retention hook 159, e.g. extending from the second radial retention hook 157 (or the first radial retention hook 155). In such embodiments, the radial retention hooks 155, 157 are configured to provide radial retention of the individual low pressure turbine blades 138 (i.e. to prevent the blades 138 from falling out of the outer drum rotor 136). Further, as shown, outer surfaces of the radial retention hooks 155, 157 are configured to provide radial retention of the individual low pressure turbine blade 138 within the outer drum rotor 136 during operation of the gas turbine engine 10.

Figure 9A:
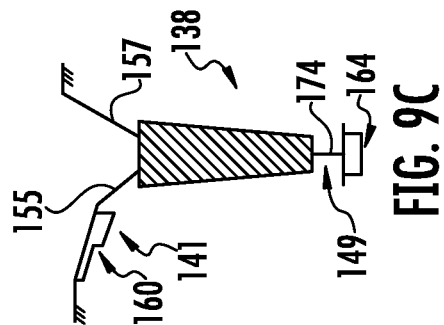
FIG. 9A illustrates a simplified, front view of one embodiment of one of the plurality of low pressure turbine blades according to the present disclosure.
Figure 9B:
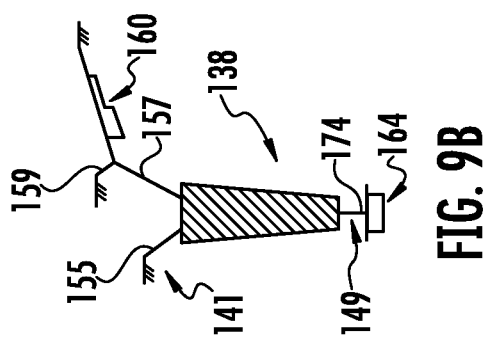
FIG. 9B illustrates a simplified, front view of another embodiment of one of the plurality of low pressure turbine blades according to the present disclosure.
Figure 9C:
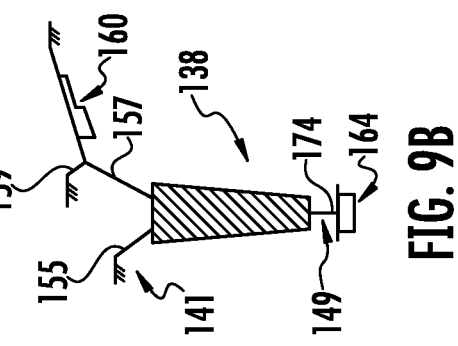
FIG. 9C illustrates a simplified, front view of yet another embodiment of one of the plurality of low pressure turbine blades according to the present disclosure.
Figure 9D:
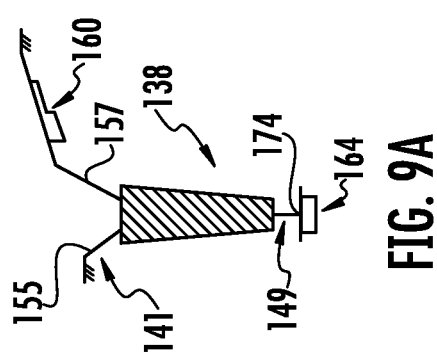
FIG. 9D illustrates a simplified, front view of still another embodiment of one of the plurality of low pressure turbine blades according to the present disclosure.

In addition, as shown, at least one of the radial retention feature(s) 145 includes at least one sealing member 160 integrated therewith. In such embodiments, as shown in FIGS. 5, 7, 8, and 9A-9F, the first radial retention hook 155 and/or the second radial retention hook 157 may include the sealing member(s) 160 on an inner surface thereof. More specifically, as shown in FIGS. 9D and 9F, the sealing member(s) may include a first sealing member 160 and a second sealing member 162. In such embodiments, as shown, the first and second radial retention hooks 155, 157 may include the first and second sealing members 160, 162, respectively, on inner surfaces thereof. In further embodiments, as shown generally in FIGS. 5-8, 9A-9B and 9D-9F, the first radial retention hook 155 may define a first length, whereas the second radial retention hook 157 may define a second length. Moreover, as shown, the second length may be about one and half times as long as the first length or vice versa so as to provide a mounting location from the sealing member(s) 160, 162 described herein. In another embodiment, the second length may be about two or three times as long as the first length or vice versa.

In addition, as shown particularly in FIG. 5 and as mentioned previously, each of the blade root portions 141 may further include one or more axial retention features 147 for axially retaining each of the blade root portions 141 within the rotatable annular outer drum rotor 136. More specifically, as shown, the axial retention feature(s) 147 may include a rotating shroud 158 attached to the rotatable annular outer drum rotor 136. In such embodiments, the rotating shroud 158 and the sealing member(s) 160 may be separate features that are spaced apart from each other. For example, as shown generally in FIGS. 5-8 and 9A-9F, the sealing member(s) 160 is integrated with the turbine blade 138 rather than being part of the rotating shroud 158. In addition, as shown in FIG. 10, the sealing member(s) 160, 162 may have a honeycomb configuration.

Figure 9E:
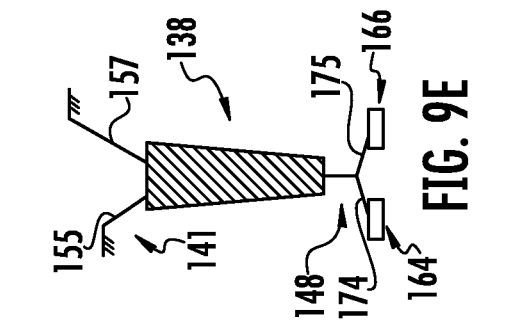
FIG. 9E illustrates a simplified, front view of another embodiment of one of the plurality of low pressure turbine blades according to the present disclosure.
Figure 9F:
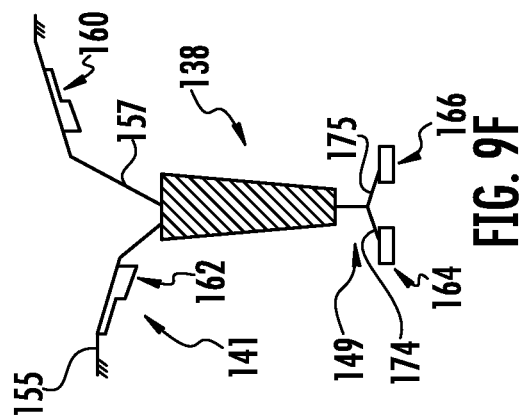
FIG. 9F illustrates a simplified, front view of yet another embodiment of one of the plurality of low pressure turbine blades according to the present disclosure.
Figure 10:
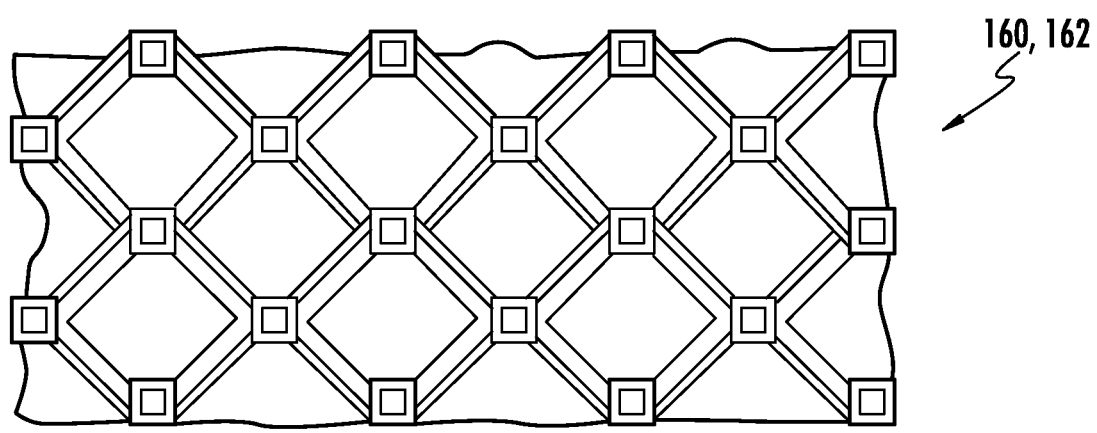
FIG. 10 illustrates a top view of one embodiment of a sealing member for a low pressure turbine blade according to the present disclosure.

Referring particularly to FIGS. 9A-9F, the blade tip portions 149 for the turbine blades 138 may include at least one additional sealing member 164, 165. For example, as shown in FIGS. 9A-9D, the blade tip portions may have an arm member 174 with the additional sealing member 164 secured thereto. In further embodiments, as shown in FIGS. 9E and 9F, the blade tip portions 149 may have at least two arm members 174, 175, each having at least one of the additional sealing members 164, 166 secured thereto. In particular embodiments, as shown generally in FIGS. 5-8 and 9A-9F, the sealing member(s) 160, 162 and the additional sealing member(s) 164, 165 may include one or more steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine defining an engine centerline, comprising:
    a rotatable annular outer drum rotor connected to a first plurality of blades, with each of the first plurality of blades comprising a blade root portion secured to the rotatable annular outer drum rotor, each of the blade root portions comprising:
        one or more radial retention features having a first radial retention hook for radially retaining each of the blade root portions within the rotatable annular outer drum rotor; and
        at least one sealing member provided along and extending radially inwardly from, with respect to the engine centerline, the one or more radial retention features, with the at least one sealing member defined by a one or more steps; and
    at least one shroud operably coupling the first radial retention hook to the rotatable annular outer drum rotor and axially retaining the blade root portions.

2. The turbomachine of claim 1, wherein the turbomachine comprises at least one of a turbine section, a compressor section, or a generator.

3. The turbomachine of claim 2, wherein the turbomachine comprises the turbine section, the turbine section comprising a high pressure rotor comprising a high pressure turbine and a low pressure turbine comprising counter rotatable low pressure inner and outer rotors located aft of the high pressure rotor, the low pressure turbine further comprising the rotatable annular outer drum rotor connected to the first plurality of blades and a rotatable annular inner drum rotor connected to a second plurality of blades.

4. The turbomachine of claim 1, wherein the one or more radial retention features further comprises a first radial retention feature and a second radial retention feature provided forward of the first radial retention feature.

5. The turbomachine of claim 4, wherein the first radial retention feature includes the first radial retention hook and the second radial retention feature includes a second radial retention hook, and wherein at least one of the first radial retention hook or the second radial retention hook comprises the at least one sealing member on an inner surface thereof.

6. The turbomachine of claim 5, further comprising a third radial retention hook extending from the first radial retention feature.

7. The turbomachine of claim 5, wherein the at least one sealing member further comprises a first sealing member and a second sealing member, wherein the first sealing member is provided on an inner surface of the first radial retention hook, and the second sealing member is provided on an inner surface of the second radial retention hook.

8. The turbomachine of claim 5, wherein the first radial retention hook defines a first length and the second radial retention hook defines a second length, the second length being at least one and a half times as long as the first length.

9. The turbomachine of claim 1, wherein the at least one shroud is a rotating shroud of the rotatable annular outer drum rotor.

10. The turbomachine of claim 9, wherein the rotating shroud and the at least one sealing member are spaced apart from each other.

11. The turbomachine of claim 1, wherein each of the first plurality of blades comprises a blade tip portion opposite the blade root portion, the blade tip portion comprising at least one additional sealing member.

12. The turbomachine of claim 11, wherein the blade tip portion further comprises at least two arm members each comprising at least one of the additional sealing members.

13. The turbomachine of claim 11, wherein the at least one additional sealing member comprise one or more steps.

14. A blade for a turbomachine defining an engine centerline, the blade comprising:
- a blade root portion for securing the blade to a rotatable annular outer drum rotor, and comprising:
  - one or more radial retention features having a first radial retention hook for radially retaining the blade root portion within the rotatable annular outer drum rotor; and
  - at least one sealing member provided along and extending radially inwardly from, with respect to the engine centerline, the one or more radial retention features, with the at least one sealing member defined by a one or more steps;
- wherein a shroud of the turbomachine operably couples the first radial retention hook to the rotatable annular outer drum rotor and axially retaining the blade root portion.

15. The blade of claim 14, wherein the one or more radial retention features further comprise a first radial retention feature and a second radial retention feature provided forward of the first radial retention feature.

16. The blade of claim 15, wherein the first radial retention feature includes the first radial retention hook and the second radial retention feature includes a second radial retention hook, and wherein at least one of the first radial retention hook or the second radial retention hook comprises the at least one sealing member on an inner surface thereof.

17. The blade of claim 16, further comprising a third radial retention hook extending from the second radial retention hook.

18. The blade of claim 16, wherein the at least one sealing member further comprises a first sealing member and a second sealing member, wherein the first sealing member is provided on an inner surface of the first radial retention hook, and the second sealing member is provided on an inner surface of the second radial retention hook.

19. The blade of claim 14, further comprising-a blade tip portion opposite the blade root portion, the blade tip portion comprising at least one additional sealing member.

20. The turbomachine of claim 1, wherein the at least one shroud is a separate component from the rotatable annular outer drum rotor and the first radial retention hook.

* * * * *